United States Patent
Holloway

[15] 3,663,236
[45] May 16, 1972

[54] BUTTER FLAVORED COMPOSITION
[72] Inventor: Milton J. Holloway, Portola Valley, Calif.
[73] Assignee: Beatrice foods Co., Chicago, Ill.
[22] Filed: Feb. 13, 1970
[21] Appl. No.: 11,340

[52] U.S. Cl..................................................99/134, 99/140
[51] Int. Cl............................................A23g 3/00, A23l 1/26
[58] Field of Search................99/134, 55, 59, 123, 136, 140, 99/200

[56] References Cited

UNITED STATES PATENTS

| | | | |
|---|---|---|---|
| 2,009,135 | 7/1935 | Grelck | 99/59 x |
| 1,721,867 | 7/1929 | Kronberg | 99/59 x |
| 3,126,283 | 3/1964 | Noznick et al. | 99/55 |

*Primary Examiner*—Raymond N. Jones
*Assistant Examiner*—J. M. Hunter
*Attorney*—Cushman, Darby & Cushman

[57] ABSTRACT

A low butterfat, butter flavored composition of sugar, condensed buttermilk, and a vegetable oil cooked together at 300° F for at least 5 min to produce a solid solution.

10 Claims, No Drawings

BUTTER FLAVORED COMPOSITION

The present invention relates to a butter flavored composition, especially to those compositions suitable for use in the manufacture of confectioneries such as candies, icings, coatings and the like. More particularly, the present invention relates to butter flavored compositions which have low butterfat content but which have the desirable characteristic flavor of butter. For example, candies such as caramels and toffees must have a butter flavor in order to be acceptable to the consuming public. Without this butter flavor the candies do not have the characteristic taste expected by the public and are therefore essentially non-salable confectioneries. Heretofore, the butter flavor has been obtained by introducing butterfat into such candy compositions, in amounts of about 4 percent or more by weight. While this amount of butterfat provides the desired butter flavor to the resulting candy composition, this relatively high butterfat content makes the candies unsuitable for consumption by people suffering from the effects of excessive cholesterol content in their blood. Furthermore, this relatively high butterfat content places the candies in the category of nonrecommended food products for people who are suffering from heart diseases or for people who are prone towards such diseases. In this latter regard, the American Medical Association has, in recent years, recommended that the general public guard against excessive consumption of foods containing high percentages of cholesterol, among such foods are those containing relatively high amounts of butterfat. It would, therefore, be desirable to produce these candies having a butter flavor but without the relatively high butterfat content of the candies produced according to known compositions and methods. However if the butterfat of such candies is simply eliminated, the taste of the resulting candy is not acceptable to the consuming public, and therefore does not obviate the problem, as noted above.

It is therefore an object of this invention to provide a butter flavored composition which is low in butterfat, but which composition yet provides the distinctive butter flavor required in certain confectioneries, especially in candy compositions. It is a further object of this invention to provide a process for producing food compositions having a butter flavor, which process results in a composition with a relatively low butterfat content but which composition will still have a butter flavor.

It has been known in the art, that butterfat contains a relatively large number of different chemical compounds, some of which have greater effects in imparting the butter flavor than other of the compounds. Among the compounds in butterfat are glycerides of fatty acids and phospholipides and phosphatides. These latter compounds are generally referred to as lecithins. It has also been known to the art, that butyric acid and esters thereof have a major role in imparting a buttery flavor to butter-containing products. Accordingly, it has been proposed in the art that a butter flavor may be imparted to food products by using small amounts of butyric acid and especially esters of butyric acid (see especially U.S. Pat. No. 2,527,785). However, the use of butyric acid and esters thereof presents a very difficult problem in compounding butter flavored food compositions, since these materials are difficult to evenly distribute throughout the food composition and the resulting flavor, while similar to that of butter, has a distinctly different taste and is not fully equatable to the natural butter flavor. Hence the use of butyric acid and esters thereof is not a fully acceptable solution to the problem of replacing butterfat in food products with a butter flavoring agent.

It has now been discovered that a very acceptable butter flavored composition can be prepared from buttermilk. Basic to the present invention is the appreciation that essentially all of the butter flavor constituents of butterfat are retained in buttermilk after essentially all of the butter has been separated therefrom. When cream is churned into butter, certain constituents of the butterfat remain in the buttermilk and these constituents are not separated from the remaining liquid after the butter has been coagulated. These constituents of butter which remain in the buttermilk liquid are fractions of the original butterfat contained in the cream before churning. While these fractions comprise only a small portion of the complex chemical constituents of the original butterfat present in the cream, and it is indeed difficult to analyze the fractions, it is known, of course, that buttermilk is relatively low in fat content, e.g. saturated fat. Hence, buttermilk will normally contain only about 1 percent or less fat, i.e. the fat content of buttermilk is approximately the same as that of skim milk or dry milk solid, as is completely appreciated by those skilled in the art. However, the flavoring constituents in buttermilk, as opposed to the flavoring constituent in dry milk solids and skim milk, are considerably different. Therefore, it is to be clearly understood that the present invention does not encompass the use of dry milk solids, skim milk or like products, since these products are not equivalent to, nor will they function in a manner similar to buttermilk when used with the present invention. It should be further understood that buttermilk in its natural state will not function according to the present invention, but to be useful according to the present invention the buttermilk must be utilized as described below. Therefore, natural buttermilk in not an equivalent of the composition of the present invention.

In the broadest form, the essential ingredients of the present composition are a special combination of a condensed buttermilk, sugar and a vegetable fat. Optionally, the combination may also contain additional water, flavoring agents, emulsifiers and salt, as well as other optional ingredients such as coloring agents and preservatives. Briefly stated the composition is prepared by blending the above essential ingredients and heating the composition until a temperature of at least 300° F., preferably 320° F. is reached and thereafter allowing the composition to remain at that temperature for at least 5 minutes preferably 10 minutes and especially 15 minutes or more, e.g. up to 30 minutes or more.

The condensed buttermilk used in the present composition is prepared by separating the butterfat solids from churned cream until the remaining liquid has a butterfat content of about 1 percent or less. The buttermilk, preferably with sugar added, is then condensed by conventional techniques, such as evaporation to produce a condensed, and preferably sweetened, buttermilk composition. While the addition of sugar to the buttermilk prior to condensing the buttermilk is not absolutely necessary, it has been found that this prior addition of sugar produces a superior product. The resulting characteristics of the condensed and sweetened buttermilk, especially the solids level and consistency thereof, are well suited for the production of confectioneries, such as candy. Accordingly, the invention will be, in the main, described in terms of this preferred embodiment.

The sweetened and condensed buttermilk should contain no more than about 35 percent by weight of water, especially less than 30 percent by weight of water. It is, however, possible to condense the sweetened buttermilk to as low as 24 percent by weight of water, but at this level of water the consistency of the condensed buttermilk becomes too viscous for readily handling and blending in preparing confectioneries and candies. Accordingly, the preferred condensed buttermilk useful with the present invention will have a water content of between about 24 percent and 35 percent by weight, and especially between about 25 percent and 30 percent by weight. Very suitably, the condensed buttermilk will have approximately 25 percent to 26 percent by weight of water therein.

The amount of sugar contained in the condensed buttermilk is not critical, and as noted above, may be absent altogether. However, it is preferred that the condensed buttermilk contain from about 30 percent to 60 percent by weight of sugar and especially between 25 percent and 55 percent by weight of sugar. Very suitably the condensed buttermilk will have about 42 percent by weight of sugar therein. For purposes of the specification and claims the term "sugar" is intended to embrace sugars broadly and include sucrose, lactose, maltose, dextrose, fructose, etc. The amount of condensed buttermilk in the butter flavored composition may vary widely but will generally be between 5 and 50 percent, especially between 20 and 40 percent by weight of the composition is suitable. When the condensed buttermilk contains sugar, as noted above, it is preferred to use the higher ranges of the buttermilk content, e.g. from about 15 to 45 percent by weight of the composition. The composition will contain, after condensing, approximately 22 percent to 35 percent by weight of buttermilk solids, especially 25 percent to 30 percent solids and very suitably about 27 percent buttermilk solids. These solids are necessary for providing, at least in part, the resulting butter flavor of the present composition.

The vegetable oils used with the present composition may be any of the edible saturated or unsaturated vegetable oils such as corn oil, soybean oil, cottonseed oil, etc. Of course, it is preferred that the vegetable oil be an unsaturated vegetable oil, e.g. safflower oil, corn oil and soybean oil, etc. However, if desired, the unsaturated vegetable oils may be partially hydrogenated or fully hydrogenated, but at least some unsaturation is, of course, preferred. It should also be appreciated that the so-called artificial fats may be used with the present composition. These fats include higher fatty acid esters of polyvalent alcohol such as monoglycerol, diglycerol and triglycerol, stearates, oleates, etc., many of which are well known in the art. In other words, it should be appreciated that the particular type of vegetable fat or artificial fat is not critical to the present invention, but that for the reasons of health noted above, the fat used with the present composition should not be an animal fat. Hence, the terms vegetable fat as used in the present specification are defined herein as any of the many known vegetable fats and artificial fat, as noted above. It should be appreciated at this point, however, that the defined vegetable fat of the present invention is necessary in order to give the full buttery flavor of the present compositions. Without the use of the vegetable fats, as defined, the full buttery flavor will not be obtained. It should also be appreciated from the above that the vegetable or artificial fat used with the present composition may be either water insoluble or water dispersible. For example, triglycerides, such as coconut oil, are water insoluble vegetable fats which may be used and the artificial fats, noted above, which are generally water dispersible may also be used. The amount of vegetable fat used with the present composition is not narrowly critical and may vary generally within the range of 1 percent to 20 percent by weight of the total composition. However, it is preferred that the percentage of vegetable fat be less than 10 percent, especially less than 5 percent, e.g. about 3 percent by weight of the composition.

The amount of total sugar in the butter flavor composition may vary widely, from as little as that contained in the condensed and sweetened buttermilk, i.e. as little as 30 percent by weight of the sweetened and condensed buttermilk up to 80 percent or higher, e.g. 90–95 percent of the total weight of the butter flavored composition. However, the amount of sugar which will be contained in the butter flavored composition and added thereto either per se or as part of the sweetened and condensed buttermilk will generally be between 5 percent and 75 percent by weight of the total composition, e.g. between 15 percent and 50 percent by weight. The composition should contain at least 5 percent by weight of sugar.

According to the present process, therefore, buttermilk of less than 1 percent by weight of butter fat is added to the amounts of sugar described above and placed into a conventional evaporating apparatus, suitably an evaporating apparatus as used to produce condensed whole milk. The mixture of buttermilk and sugar is condensed in a conventional manner until the water content, as noted above, is reached.

In any suitable cooker, e.g. an open kettle, the sweetened and condensed buttermilk is mixed with any of the desired vegetable oils, noted above. At this point the optional ingredients, noted above, may be added and the mixture is gently cooked until a temperature of at least 300° F., preferably 320° F., but not over 400° F., especially not over 350° F., is reached. Thereafter the mixture must cook for at least 5 minutes, preferably at least 10 minutes and especially at least 15 minutes. Cooking times beyond 30 minutes are not normally required or desired and generally, the cooking should not be longer than 1 hour, although the quality of the flavor produced does not drop radically with extended cooking periods, e.g. 5 hours or more.

After the mixture is cooked for the times noted above, it is cooled to any desired temperature below the above noted cooking temperatures. As a general practice the mixture is simply cooled to room temperature by pouring the cooked mixture into suitable containers, e.g. greased pans or pans with an anti-stick surface. Hence, the composition may then be stored until its use is required without any special or unusual storage conditions. For ease of handling, however, the solidified mass, after cooling, may be broken up into chunks or powdered by any conventional means.

Alternately, the composition may be produced in situ while making a confectionery, if the particular confectionery may be cooked for the times and at the temperatures noted above. For example, the above composition may be cooked, as noted above, with flavoring agents added, e.g. vanilla, chocolate, etc., and any desired water, additional sugar, skim milk solids, emulsifiers, etc., to produce a hard toffee (after cooling) directly.

As a further feature of the invention it has been discovered that the well known and most common "burnt sugar" coacts with the above composition to produce an even better butter flavor. The flavor of "burnt sugar" unexpectedly adds to the flavor of the composition to produce a butter flavor which is distinct from the flavor of burnt sugar and burnt sugar, therefore, acts in a synergistic manner. The amount of "burnt sugar" which may be added is not narrowly critical and can vary from, of course, none at all, as noted above, up to about an amount equal to the total weight amount of the condensed buttermilk (or sweetened and condensed buttermilk). Preferably, the burnt sugar is in an amount of at least 5 percent but does not exceed 75 percent, especially 60 percent, e.g. 50 percent, by weight of the condensed or sweetened and condensed buttermilk.

As a further optional feature of the invention, the butter flavor may be produced with additional sugar, the amount being as desired. Optionally the required amount or a part of the required amount of sugar for any particular confectionery composition may be added in preparing the present butter flavor. This feature is a preferred embodiment since it eliminates, or partially eliminated, a second cooking step required for any additional sugar added when making a finished confectionery with the present butter flavor. In a similar manner, the other ingredients normally used in making confectioneries may also be incorporated in the present flavoring composition, either prior to or during the above noted cooking step. Hence, other conventional flavoring agents, e.g. salt, vanilla, cream of tartar, etc., may be added to the composition as desired. Also conventional emulsifiers, dispersing agents and preservatives may be added. Likewise, any additional liquids, such as water or milk, etc., required for a particular confectionery may also be added prior to or during the cooking step. As can be appreciated, all of the above optional ingredients do not form the essence of the present invention but are merely optional ways of incorporating conventional and known ingredients into the composition of the present invention, which consists essentially of the condensed buttermilk (or sweetened and condensed buttermilk), the vegetable oil and especially that composition also containing burnt sugar. The amounts of the conventional and optional ingredients, noted above, are not critical and may be as desired or as required by any particular confectionery.

It should also be appreciated from the above that the composition must be cooked in order to develop the butter flavor. During cooking, the condensed buttermilk, sugar and vegetable oil coact to produce the flavor. The cooking forms a solution or dispersion of the ingredients which is defined, for purposes of the specification and claims, as a "solid solution." Of course, "solid" in this case includes the "viscose" solution obtained during cooking.

The following examples will illustrate the invention in terms of producing the butter flavored composition with additional sugar and flavoring, the preferred embodiment, so that the composition may be used directly for making a toffee. All percentages are by weight unless otherwise noted.

EXAMPLE 1

| Into a cooking kettle were placed: | |
| --- | --- |
| Sugar | 82 lbs. |
| Water | 10 lbs. |
| Condensed and sweetened buttermilk having 27% buttermilk solids, 42% sugar and 1% butterfat | 15 lbs. |
| Coconut Oil | 12 lbs. |
| Burnt Sugar | 7½ lbs. |
| Vanilla | 4 ozs. |
| Aldo No. 33 (glycerol monostearate an emulsifier) | 4 ozs. |
| Salt | 4 ozs. |

The mixture was gently heated with stirring until a temperature of 320° F. was reached and then cooked 15 minutes at that temperature. Thereafter, the cooked mixture was cooled to room temperature in a greased pan and broken up into small pieces.

EXAMPLE 2

The composition of Example 1 was added to a conventional caramel composition and produced an excellent butter flavored caramel.

EXAMPLE 3

The composition of Example 1 was added to a conventional chocolate and imitation chocolate composition and produced excellent butter flavored chocolate confectioneries.

EXAMPLE 4

The procedure of Example 1 was repeated except that the vanilla, Aldo and salt were not used in the composition. The resulting composition had an excellent butter taste.

EXAMPLE 5

The procedure of Example 4 was repeated except that the burnt sugar was also omitted from the composition. While a butter flavor was obtained, the flavor was not as good as that of Example 4.

EXAMPLE 6

The procedure of Example 5 was repeated, except that the coconut oil was also omitted. The resulting composition did not have any significant butter taste.

What is claimed is:

1. The process for producing a butter flavored composition comprising heating to at least 300° F a mixture of 5 percent to 75 percent sugar, 24 percent to 35 percent water, 1 percent to 20 percent vegetable fat and 5 to 50 percent condensed buttermilk of 1 percent or less butterfat content and having 22 percent to 35 percent solids where all percentages are by weight, and allowing said mixture to remain at the said temperature for at least 5 minutes.

2. The process of claim 1 wherein the mixture also contains at least 5 percent of burnt sugar based on the weight of the condensed buttermilk.

3. The process of claim 1 wherein the mixture also contains flavoring agents, preservatives, emulsifiers, coloring agents and dispersing agents.

4. The process of claim 1 wherein the condensed buttermilk contains a portion of sugar, and the amount of sugar in the condensed buttermilk is between 30 percent and 60 percent by weight of the condensed buttermilk.

5. The process of claim 1 wherein the water content of the condensed buttermilk is between 25 percent and 30 percent by weight.

6. The process of claim 5 wherein the water content is between 25 percent and 26 percent by weight.

7. The process of claim 1 wherein the amount of condensed buttermilk is between 15 percent and 45 percent.

8. The process of claim 1 wherein the amount of vegetable fat is between 1 percent and 5 percent.

9. The process of claim 1 wherein the amount of sugar is between 15 percent and 50 percent.

10. The product produced by the process of claim 1.

* * * * *